Patented June 21, 1932

1,863,572

UNITED STATES PATENT OFFICE

WILHELM LOMMEL, OF WIESDORF-ON-THE-RHINE, THEODOR GOOST, OF LEVERKUSEN-ON-THE-RHINE, AND HERMANN FRIEDRICH, OF WIESDORF-ON-THE-RHINE, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

N-SUBSTITUTED DITHIOCARBAMIC ACIDS AND THE SALTS THEREOF

No Drawing. Application filed December 15, 1927, Serial No. 240,332, and in Germany December 18, 1926.

The present invention relates to compounds of the general formula

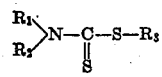

in which $R_1$ signifies an alicyclic residue, which is connected with nitrogen directly or by means of one or more carbon atoms, and $R_2$ a monovalent organic radicle, such as an alicyclic group, which is connected directly or indirectly with N, or aryl or aralkyl and alkyl with a straight or branched chain which may be linked up to $R_1$ so as to form a ring configuration, and in which $R_3$ represents hydrogen, a metal or an ammonium residue, the hydrogen atoms of which may be wholly or partly replaced e. g., by alkyl, aryl, aralkyl or an alicyclic residue.

Our compounds may be obtained by the reaction of carbon bisulfide on secondary alicyclic bases. The reaction can take place in the presence of other organic or inorganic bases or oxides or hydroxides.

The carbon bisulfide and the bases can be mixed together without any diluent, while the reaction mass is cooled; advantageously, the process is carried out in the presence of a diluent e. g. chlorobenzene, carbontetrachloride, benzene, alcohol, water etc.

Some of the products are solid compounds, others are oils and resins. Nearly all of them are difficultly soluble in ether and benzene, some are soluble in chloroform, benzene, alcohol, and some in water. They cannot be distilled. If they are heated at elevated temperatures, decomposition takes place. By slight oxidation, thiuramdisulfides are formed.

Our compounds are valuable in the process of vulcanizing rubber and can be used as such, or in solution, e. g. benzene or water.

*Example 1.*—13 parts hexahydroethylaniline are mixed with ice and gradually treated with 4 parts of carbon disulphide, while stirring. The condensation product of the formula

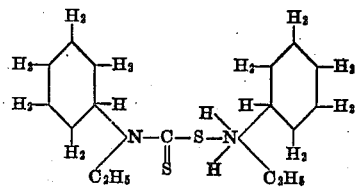

separates at first in the form of a resin which solidifies after some time.

The homologues and analogues, such as for example hexahydromethylaniline, hexahydromethyl-ortho-, meta- and para-toluidines, hexahydroethyl-ortho- and para-toluidines, dekahydroethylnaphthylamine and the like behave in a similar manner.

*Example 2.*—76 parts of carbon disulfide are allowed to run gradually into a cooled mixture, being stirred, of 127 parts of hexahydroethylaniline, 99 parts of hexahydroaniline and 400 parts of ice water. The hexahydroaniline salt of ethylhexahydrophenyldithiocarbamic acid separates out, at first in the form of an oil which becomes crystalline after some time. It has the formula

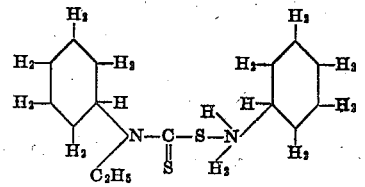

*Example 3.*—76 parts of carbon disulfide are allowed to run into a stirred and cooled mixture of 141 parts of ethylhexahydro-ortho-toluidine and 40 parts of sodium hydroxide in water. The sodium salt of ethylhexa-hydro-ortho-tolyldithiocarbamic acid of the formula

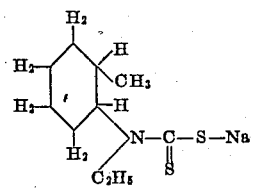

is obtained, when it has been salted out with common salt and filtered.

*Example 4.*—76 parts of carbon disulfide are introduced at a temperature below 10° C. into a mixture of 127 parts of hexahydro-ethylaniline, 500 parts of water and 85 parts of 48% caustic soda solution. When all substances have been completely dissolved, evaporation in vacuo is carried out at a low temperature. The sodium salt of ethylhexa-hydrophenyl-dithiocarbamic acid of the formula

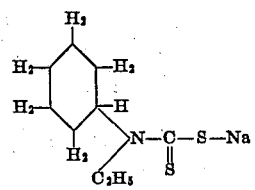

is obtained as a dry, non-hygroscopic white powder melting at 92–98° C. It is very easily soluble in water and alcohol, and also somewhat soluble in benzene. The yield amounts to almost 100%.

*Example 5.*—76 parts of carbon disulfide are introduced with stirring and cooling into 113 parts of hexa-hydromethylaniline to which ice water and 200 parts of caustic potash lye of 30° Bé. have been added. The potassium salt of methylhexahydrophenyl-dithiocarbamic acid of the formula

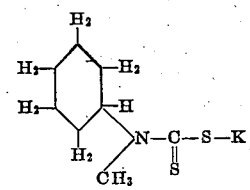

separates in the form of needles, melting at 120° C.

*Example 6.*—To the solution of the sodium salt of ethylhexahydrophenyl-dithiocarbamic acid prepared according to Example 4, a solution of 123 parts of barium chloride in 400 parts of water is added. The barium salt of ethylhexahydrophenyl-dithiocarbamic acid of the formula

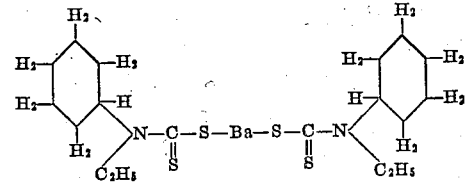

separates in the form of laminæ. Their solubility in water at a temperature of about 50–60° C. amounts to about 5%.

*Example 7.*—The barium salt obtained by the procedure of Example 6 is dissolved in 30 times its amount of water at about 40–50° C., and a concentrated solution of 124 parts of magnesium sulfate is added with stirring. The mixture is filtered and the filtrate evaporated in vacuo. In this manner, the magnesium salt of ethylhexahydrophenyl-dithiocarbamic acid of the formula

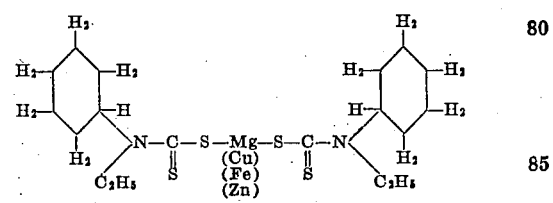

is obtained which is fairly easily soluble in water. By replacing the magnesium sulphate with copper, iron or zinc sulphate the corresponding copper, iron or zinc salts are obtained.

*Example 8.*—When in Example 7 the magnesium sulfate is replaced with a solution of 99 parts of hexahydroaniline in 200 parts of 18% hydrochloric acid, the hexahydroaniline salt of ethylhexahydrophenyl-dithiocarbamic acid of the formula

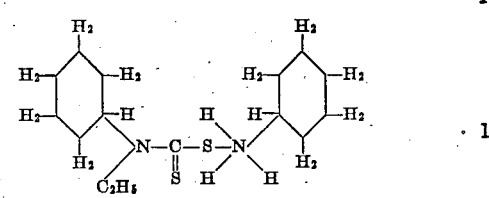

is obtained in the form of fine needles melting at 85–90° C.

If instead of hexahydroaniline-hydrochloride an equivalent quantity of dicyclohexyl-amine-hydrochloride is employed, a dicyclohexylamine salt of ethylhexahydrophenyl-dithiocarbamic acid of the formula

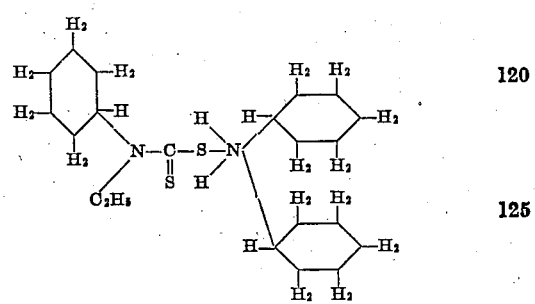

melting at 106–108° C. is obtained. By employing diphenylguanidine hydrochloride the diphenylguanidine salt of the formula

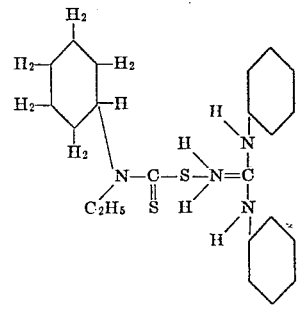

is obtained melting at 90–95° C.; if ethylenediamine hydrochloride is employed, the corresponding ethylenediamine salt of the formula

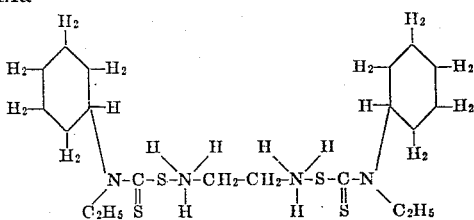

is obtained melting at 67–71° C., and when the hydrochloride of amino alcohol is used, the corresponding salt of ethanolamine of the formula

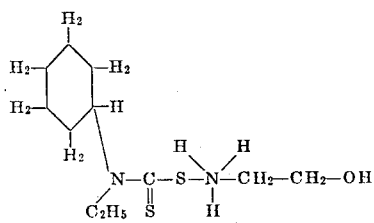

results, melting at 85–90° C.

*Example 9.*—The sodium salt of ethylhexahydro-ortho-tolyldithiocarbamic acid prepared in accordance with Example 3 is dissolved in water and a solution of 70 parts of zinc chloride is added. The difficultly soluble white zinc salt of ethylhexahydro-orthotolyldithiocarbamic acid precipitates; it is separated by filtering and washing. It has the following formula

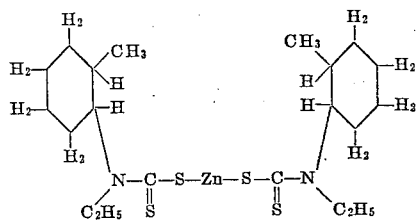

*Example 10.*—76 parts of carbon disulfide are gradually run into a cooled mixture, being stirred, of 306 parts of decahydrochinaldine and 500 parts of ice water. 2-methyl-decahydroquinolyl salt of 2-methyl-decahydroquinolyl-N-carbithionic acid separates out in the form of a yellowish oil. It has the formula

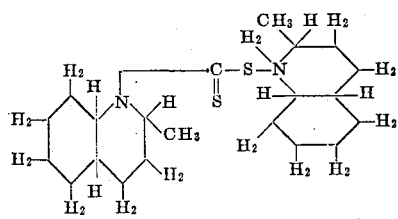

*Example 11.*—76 parts of carbon disulfide are gradually run into a stirred and cooled mixture of 278 parts of perhydro-2-methylindol and 500 parts of ice water. The perhydro-2-methylindolsalt of perhydro-2-methyl-indolyl-N-carbithionic acid separates out in the form of an oil. It has the formula

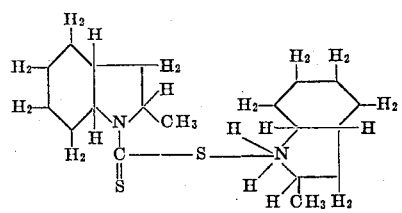

We claim:—

1. As new products the compounds of the general formula:

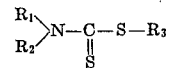

wherein $R_1$ represents an alicyclic radicle, $R_2$ a monovalent hydrocarbon radicle selected from the class consisting of alicyclic, alkyl, aryl and aralkyl radicles and $R_3$ hydrogen, a metal, ammonium, or ammonium having at least one hydrogen replaced by a radicle selected from the class consisting of alicyclic, alkyl, aryl and aralkyl radicles.

2. As new products, the compounds of the general formula:

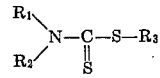

wherein $R_1$ represents an alicyclic radicle, $R_2$ a monovalent hydrocarbon radicle selected from the class consisting of alicyclic, alkyl, aryl and aralkyl radicles and $R_3$ ammonium or ammonium having at least one hydrogen replaced by a radicle selected from the class consisting of alicyclic, alkyl, aryl and aralkyl radicles.

3. As new products the compounds of the general formula:

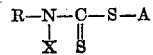

wherein $R_1$ represents the radicle of a cyclohexyl compound, X methyl or ethyl and A a metal radicle, ammonium or ammonium having at least one hydrogen replaced by a radicle selected from the class consisting of alicyclic, alkyl, aryl and aralkyl radicles.

4. As new products the compounds of the general formula:

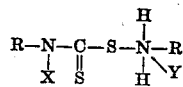

wherein R represents the radicle of the cyclohexyl compound, X methyl or ethyl and Y hydrogen, alkl or cyclo-alkyl.

5. The compound of the formula

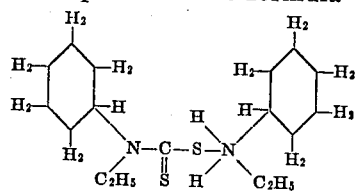

forming a resin which solidifies after some time.

6. The compound of the probable formula:

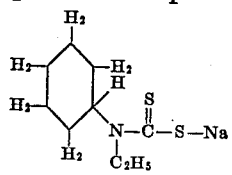

forming a non-hygroscopic white powder melting at 92–98° C.

7. As new products, compounds of the general formula:

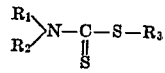

wherein $R_1$ represents an alicylic radicle, $R_2$ a monovalent hydrocarbon radicle having at least 2 carbon atoms and selected from the class consisting of alicylic, alkyl, aryl and aralkyl and $R_3$ hydrogen, a metal, ammonium or ammonium having at least one hydrogen replaced by a radicle selected from the class consisting of alicyclic, alkyl, aryl and aralkyl radicles.

In testimony whereof we have hereunto set our hands.

WILHELM LOMMEL.
THEODOR GOOST.
HERMANN FRIEDRICH.

CERTIFICATE OF CORRECTION.

Patent No. 1,863,572.                                                               June 21, 1932.

WILHELM LOMMEL ET AL.

It is hereby certified that error appears in the printed specification of the above numbered patent requiring correction as follows: Page 1, line 35, for "ether and benzene" read "ether and benzine"; page 4, line 11, claim 4, for "alkl" read "alkyl"; and that the said Letters Patent should be read with these corrections therein that the same may conform to the record of the case in the Patent Office.

Signed and sealed this 10th day of January, A. D. 1933.

(Seal)                                         M. J. Moore,
                                              Acting Commissioner of Patents.